No. 822,187. PATENTED MAY 29, 1906.
W. G. CONOVER.
CORN HUSKING MACHINE.
APPLICATION FILED AUG. 16, 1905.
3 SHEETS—SHEET 1.
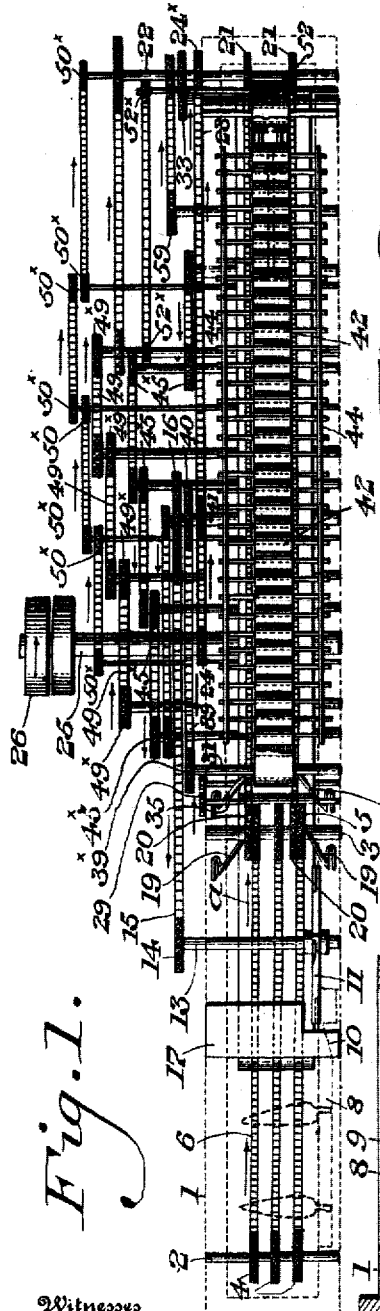
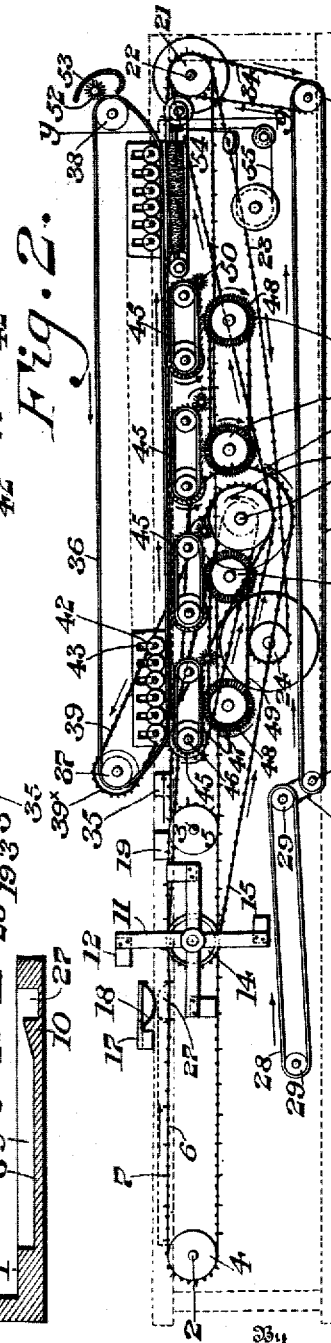
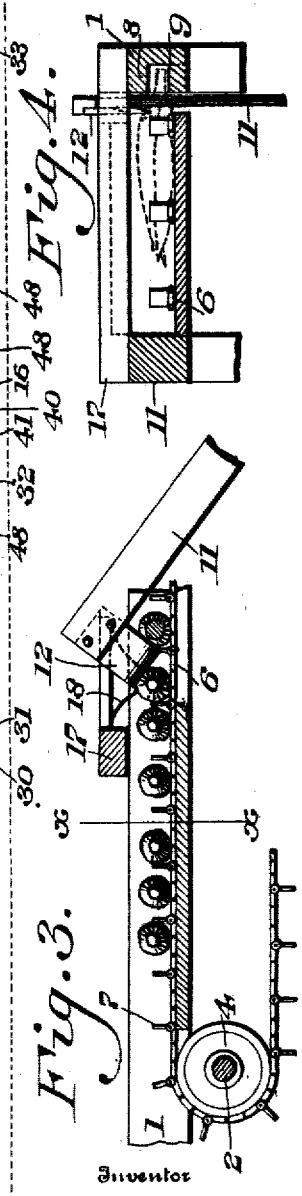
Witnesses
P. F. Nagle.
C. S. McVay.
Inventor
William G. Conover.
By
Diedensheim & Fairbanks
Attorneys No. 822,187. PATENTED MAY 29, 1906.
W. G. CONOVER.
CORN HUSKING MACHINE.
APPLICATION FILED AUG. 16, 1905.
3 SHEETS—SHEET 2.
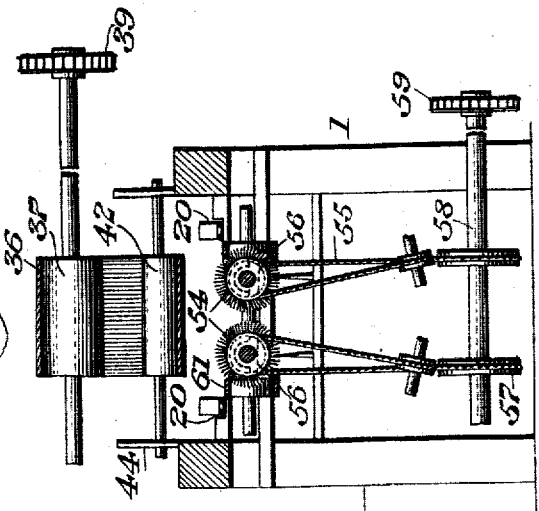
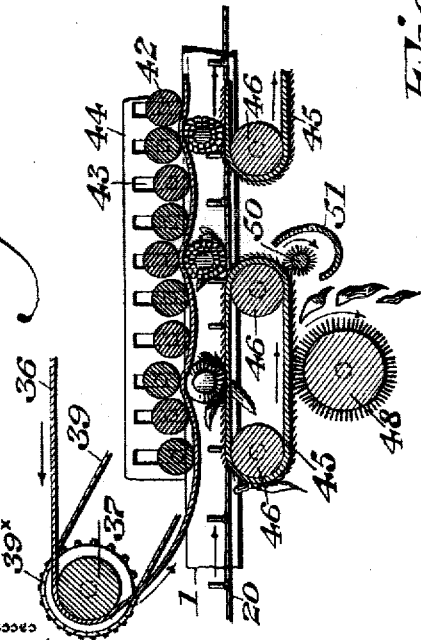
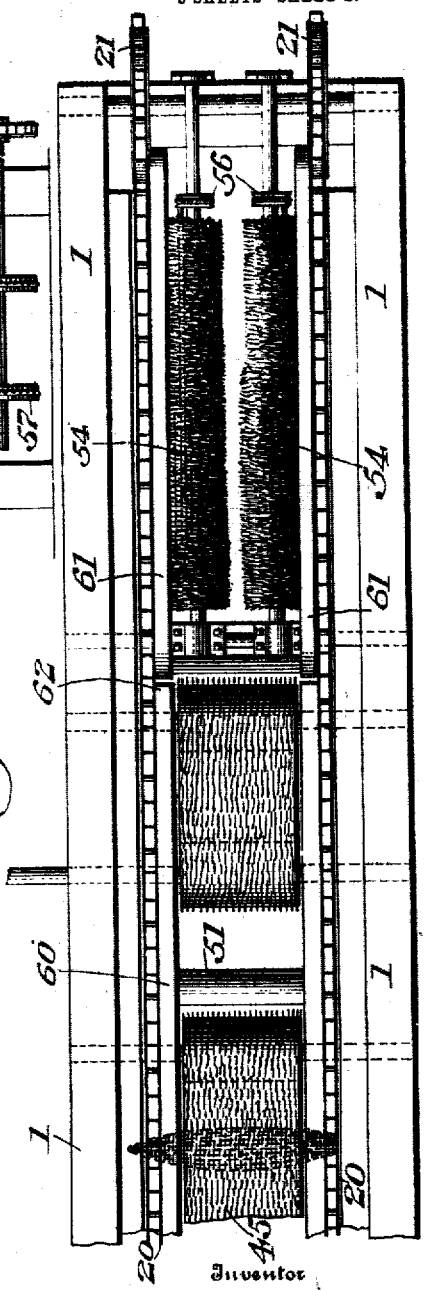
Witnesses
P. F. Nagle.
C. S. McVay.
Inventor
William G. Conover.
By Biedensheim & Fairbanks.
Attorneys No. 822,187. PATENTED MAY 29, 1906.
W. G. CONOVER.
CORN HUSKING MACHINE.
APPLICATION FILED AUG. 18, 1905.
3 SHEETS—SHEET 3.
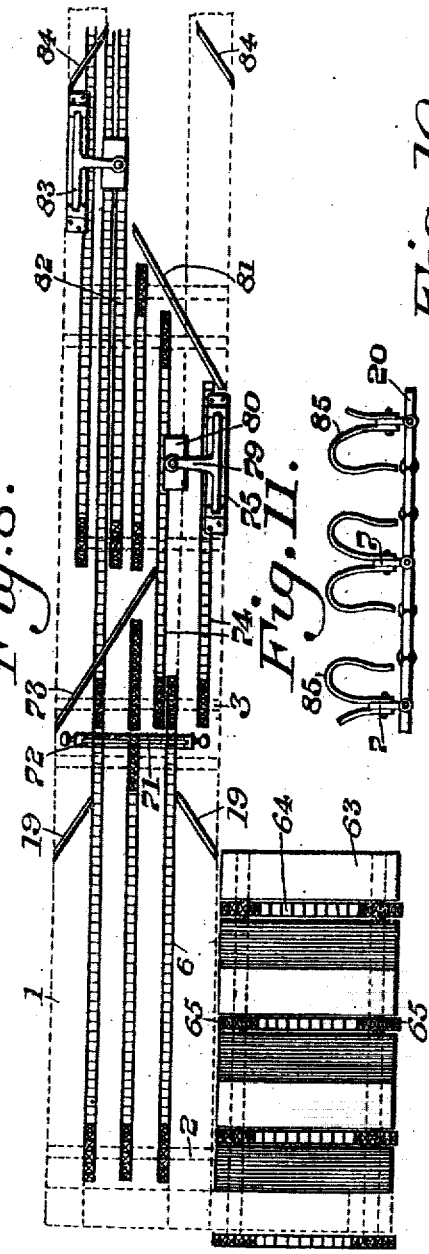
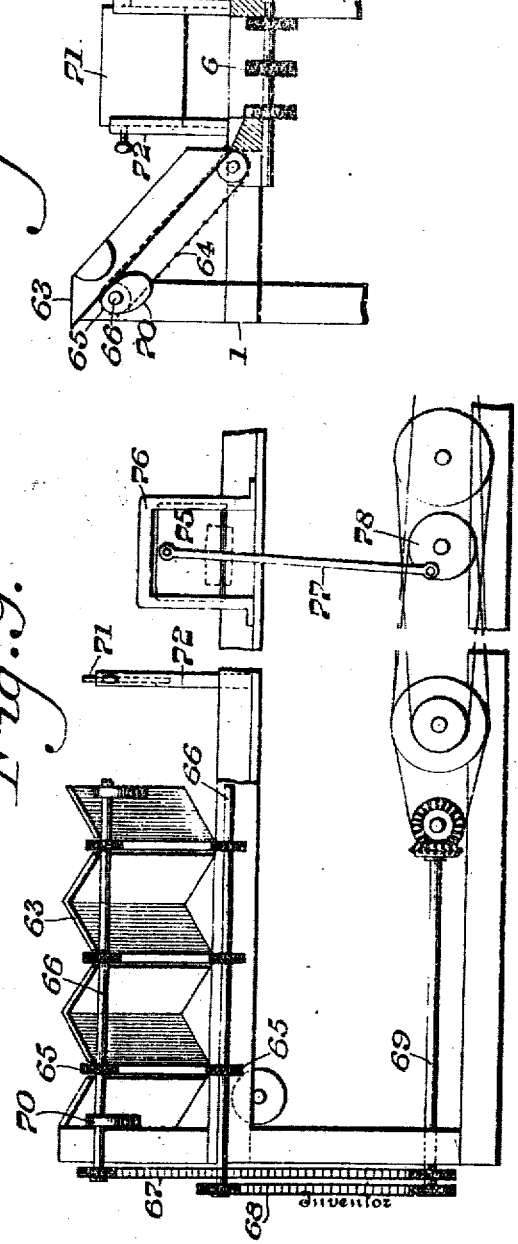

UNITED STATES PATENT OFFICE.

WILLIAM G. CONOVER, OF PHILADELPHIA, PENNSYLVANIA.

CORN-HUSKING MACHINE.

No. 822,187.　　　　Specification of Letters Patent.　　　Patented May 29, 1906.

Application filed August 16, 1905. Serial No. 274,373.

*To all whom it may concern:*

Be it known that I, WILLIAM G. CONOVER, a citizen of the United States, residing in the city and county of Philadelphia, State of Pennsylvania, have invented a new and useful Corn-Husking Machine, of which the following is a specification.

My invention consists of a new and useful corn-husking machine which is adapted to automatically remove the end from the corn, after which the husk is removed and after that the silk is removed and the clean and husked corn directed to a suitable point.

It further consists in a new and useful means for properly locating the corn in order to suitably direct the same through the machine.

It further consists of novel means for cutting the ends of the corn.

It further consists of novel means for removing the husks.

It further consists of novel means for removing the silk.

It further consists of a novel feed for the corn.

It further consists in providing means whereby both ends of the corn may be removed when desired.

It further consists in novel features of construction, all as will be hereinafter fully set forth.

Figure 1 represents a plan view of a corn-husking machine embodying my invention, showing the frame in dotted lines. Fig. 2 represents a side elevation thereof. Fig. 3 represents, on an enlarged scale, a portion of the machine, showing the cutter in operation. Fig. 4 represents a sectional view on line *x x*, Fig. 3. Fig. 5 represents, on an enlarged scale, a portion of the device, showing the husks being removed. Fig. 6 represents a sectional view on line *y y*, Fig. 2. Fig. 7 represents a plan view of a portion of the device, showing the silk-removing brushes and with a portion of the machine removed. Fig. 8 represents a diagrammatic plan view of the machine, showing a slightly-different construction. Fig. 9 represents a diagrammatic side elevation thereof. Fig. 10 represents a partial section and partial end elevation of a portion of the device. Fig. 11 represents a side elevation of a conveyer provided with corn-retaining clips.

In order to have machines of this character operate successfully, it is necessary to provide means for accommodating various lengths of the corn, as well as varying diameters thereof, and in my machine I have provided conveyers upon which the corn is fed which will accommodate corn of any length. I have provided suitable means in order that the corn will be properly directed to the cutting means, so that the corn will be properly presented to a cutter, should but one cutter be used or to a plurality of cutters if used on opposite sides of the machine.

I have further arranged the husk-removing means in such a manner so that the husks of each ear will be positively removed, and I have provided a yielding device for both rotating and holding the corn in proper position with respect to the husking means and the silk-removing means, which is adapted to accommodate corn of varying thickness or diameter.

Similar numerals of reference indicate corresponding parts in the figures.

Referring to the drawings, 1 designates the frame of the machine, (shown in dotted lines,) upon which the various parts are supported. Suitably mounted in bearings thereon are shafts 2 and 3, the shaft 2 having mounted thereon the sprockets 4 and the shaft 3 having mounted thereon the sprockets 5, around which pass the chains or conveyers 6, said chains having extending lugs 7 thereon situated at a suitable distance apart in order to engage the corn as it is fed upon said conveyers.

8 designates a guide carried at one side of the machine, in which is a suitable opening 9, through which the end of the corn is adapted to project in order that the same will be in proper position on the conveyers. The guide 8 is provided with an inclined face 10, which directs the corn into the proper position in order to have the end removed by means of the cutter 11. This in Fig. 2 is shown as a rotary device having the knife-edges 12 thereon, said cutter being mounted on a shaft 13, which carries the sprocket 14. This sprocket is in engagement with the chain 15, which passes around a suitable sprocket 16 in order to receive motion therefrom.

17 designates a bar which extends above the conveyers, which is provided with a suitable number of springs 18, suitably supported and with which the corn is adapted to contact in its passage, so that said springs hold the corn at the time one of the knives 12 cuts the same in order that the same will not be removed from its position on the conveyers.

After the end of the corn has been removed by the knives the conveyers carry the same in the direction indicated by the arrow $a$, Fig. 1, until the corn comes in contact with the spring-guides 19, which properly locate the corn upon the conveyers until the same is received by the chains or conveyers 20, which pass around suitable sprockets on the shaft 3 and extend between the members of frame of the machine. They pass around the sprockets 21 adjacent the discharge end of the machine and are carried by the shaft 22, said shaft 22 receiving motion through a suitable chain 23. This passes around a sprocket $24^\times$ and the sprocket 24, carried on the shaft 25, which is the main driving-shaft of the machine and to which power is imparted through the pulleys 26 by means of a belt or other suitable device.

As the conveyers 20 are operated they impart motion to the shaft 3, which in turn operates the conveyers 6. The guide 8 is provided with a suitable opening 27, through which the cut end of the corn falls, being received by the belt 28, mounted on the pulleys 29. This actuates the belt in the direction indicated by the arrow, Fig. 2, motion being imparted to one of said pulleys 29 by the chain 30, which receives motion from a pulley 31, around which passes the belt 32, which also passes around the pulley 33, to which motion is imparted by the chain 34 in suitable connection with the shaft 22. After the corn has been received upon the conveyers 20 it is directed against a second set of guides, which are spring-arms 35, in order that the corn be located in proper position on the conveyers to have the husk removed therefrom.

36 designates a belt which passes around the pulleys 37 and 38, suitable motion being imparted to the pulley 37 by the chain 39 passing around the sprocket $39^\times$ and also passing around a suitable sprocket 40, carried on the shaft 41. Said belt is situated above the conveyers 20 and passes between the same and a plurality of idlers 42, which are suitably mounted in slots 43 in a frame 44, so that said idlers can have a slight longitudinal movement, although they normally bear upon said belt to hold the same in proper relation with respect to said conveyers 20.

45 designates a belt, upon the outer face of which is provided a plurality of teeth, which passes around the pulleys 46; suitable motion being imparted thereto by means of sprockets $45^\times$, suitably actuated by a chain, which is in suitable relation to said shaft 41, it being understood that the said belt 45 is situated between the conveyers 20 and beneath the belt 36, so that as the corn is carried by said conveyers it is brought into contact with the teeth on the belt 45, it being understood that any suitable movable support for the teeth may be employed. As the belt 36 in its movements rotates the corn on the conveyers the teeth of the belt 45 engage with and remove the husks from the corn. In the drawings I have shown four sets of belts similar to 45, which I have indicated by said numeral, provided with teeth which are suitably actuated by belts and sprockets $45^\times$ in order that each ear of corn will positively have the husk removed therefrom, since it might occur that as the ears are successively presented to the first belt 45 the teeth on said belt might still have some of the husk thereon from the preceding ears, and hence would not remove the husk from the next ear or next but one. By having the four sets I provide a means for positively removing the husk, although it may not be necessary to employ four sets of belts, as I may find it practical to employ a single belt with teeth thereon mounted in any suitable manner. Situated beneath the said belts 45 are wire brushes 48, which are suitably actuated by the chains 49, passing around the sprockets $49^\times$, which remove from the teeth the husks which may remain, the same falling therefrom and being directed upon the belt 32, which conveys same to a suitable point of discharge. It will of course be understood that the other belts 45 and brushes 48 are suitably actuated.

50 designates bristle-brushes which are situated adjacent the belt 45 and are actuated by belts passing around the sprockets $50^\times$ and are adapted to cleanse the teeth after the husks have been removed by the brushes 48. It will be seen in this manner that the corn is carried by the conveyers 20 between the belt 36 and belt or belts 45, so that the husks are removed, and the idlers 42 being movable adapt the machine to accommodate ears of corn of varying thickness or diameter.

51 designates protectors (shown in Fig. 5 and omitted from Fig. 2 for clearness) for the brushes 50, which partly surround the same in order to prevent the material from the brushes being thrown upon the machine.

52 designates a brush situated adjacent the belt 36, which is adapted to be actuated by the chain passing around sprockets $52^\times$ to clean the same, a suitable protector 53 being provided for said brush. It will be understood that the various sprockets are suitably mounted in the frame of the machine and that the same all receive motion by a proper chain connection with the drive-shaft 25, and I have not deemed it necessary to describe this in detail, as any suitable arrangement of chains and sprockets will answer. After the husks have been removed the corn is preserved to the silk-removing means, which consists of the brushes 54, which extend longitudinally of the machine and project upwardly between the conveyers 20 a suitable distance, said brushes being rotated toward each other by belts 55, passing around pulleys 56 on the shafts which carry the brushes. Said belts also pass around the pulleys 57, mounted on the shaft 58, which receives motion from a chain passing around sprocket 59, it being understood that the belt 36 extends over the brushes 54, and hence tends to rotate and press the corn against the said brushes, so that the silk is removed and the cleaned corn discharged at the end of the machine.

I preferably have the conveyers 20 operating in suitable grooves in the portion 60 of the frame of the machine; but on each side of the brushes 54 I have placed the belts 61, which pass around pulleys suitably actuated in order that should a short ear of corn be presented to the brushes 54—that is, one which will not reach from one conveyer 20 to the other—the said ear will be carried by the belts 61, it being necessary to stop the portion 60 of the frame at 62 (shown in Fig. 7) in order to accommodate the brushes.

85 designates spring-clips suitably secured to the lugs 7, which would be employed in case I dispense with the guides 8.

The operation of the device will be readily understood. Motion being imparted to the pulleys 26, the various parts of the machine are placed in motion. The corn is fed upon conveyers 6 by hand, the operator placing the ear on the conveyers and against the guide 8, and the lugs 7 engage with the corn to carry the same, the inclined face 10 of the guide 8 placing the corn in the proper position on the conveyers to engage the cutters 12, which are rotated at a suitable speed and so timed as to remove the end of each ear, the springs 18 holding said ear as the cutting is accomplished. After the end is cut the corn passes between the guides 19 in order that it may be properly placed upon the conveyers 20, which carry the corn between the guides 35 and then between the belt 36 and the various husking means 45, which are so actuated that the teeth on the husking means or belts 45 engage with the husks and remove the same, this operation being best understood from Fig. 5. It will be seen in said figure that the movable idlers 42 are aised, if necessary, during the passage of the corn between the belts, but that they still hold the belt in proper relation to the corn in order to rotate the same. The husks removed from the corn will fall upon the belt 32 and be conveyed to a suitable point. The corn after being husked is carried along by conveyers 20 until it reaches the brushes 54, which are rotated toward each other and which engage with the silk and remove the same from the corn, any suitable means being employed for removing the silk from the brushes or cleaning the same.

It will be understood from the above that my machine is adapted to automatically remove the end from the corn, remove the husks and the silk, and direct the cleaned corn to a suitable point, the machine being adapted to cut and clean corn of any length and varying thickness or diameter. In some instances it may be necessary to remove both ends of the corn, and it may be advantageous to feed the corn automatically to the machine, and in Figs. 8, 9, and 10 I have shown a hopper which can be applied to the machine which is adapted to automatcially feed the corn, and I have shown a cutter on each side of the machine, it being understood that the cutters may be similar to the cutter 11 shown in other figures or the form of cutter may be varied as desired and may be of that form shown in Figs. 8 and 9. In said figures, I have shown the conveyers 6, and adjacent the same I have shown a hopper 63, which is formed of a plurality of troughs, at the base of each of which I provide a chain 64, passing around suitable sprockets 65, carried on the shaft 66, to which motion is imparted by chains 67 and 68, which receive motion from the sprockets mounted on the shaft 69 suitably actuated. Also mounted on the shaft 66 are cams 70, which are adapted to contact at the proper time with the hopper in order to rock the same, thus preventing the corn from jamming or remaining in said hopper. The corn being received on the conveyer 6 is passed between the guides 19 and passed beneath the gate 71, which is movably mounted in the housing 72 and which is adapted to be secured in any adjusted position. The corn is carried by the conveyers and contacts with the guide 73, which may be of the form of a spring-arm and which directs the corn to one side of the machine and to the conveyers 74. These are adapted to carry the corn to a point beneath the knife, which reciprocates in a suitable frame 76, carried by the frame 1 of the machine, said knife being actuated in any suitable manner, as by the bar 77, connected with the pulley 78, which receives suitable motion by means of belts or other means in suitable connection with the main shaft of the machine, any suitable means being provided adjacent the chains 74 to properly direct the corn beneath the cutter. Carried by the cutter is an arm 79, which carries the plate 80, the same reciprocating with the knife and being adapted to contact with the corn as the same is being cut in order to hold the corn and prevent displacement thereof, the same acting in a similar manner as the springs 18 previously described.

After one end of the corn is cut the corn is carried on by the chains or conveyers 74 and contacts with the spring-guides 81, which direct the corn to the other side of the machine and upon the conveyers 82, the same directing the opposite end of the corn to a suitable point beneath the knife of cutter 83, actuated in the same manner as the cutter 75, whereby the other end of the corn will be cut, the corn being then carried by the conveyers 82 between the guides 84, which properly locate the corn in order that the same may be delivered to conveyers similar to 20, after which the corn passes through the husking and silk-removing mechanism, as before described.

It will be seen that the gate 71 is placed at the desired height in the housing 72, depending upon the average diameters of the corn to be husked, so that more than one ear at a time on the conveyers cannot pass thereunder, thus preventing an ear of corn resting above another.

In case I wish to dispense with the guides 8 clip-springs 85, as seen in Fig. 11, would be employed, said clips being suitably secured to the lug 7, and the ears of corn would force the springs apart and said ears would be firmly held in place therebetween. The operator or feeder would soon become so expert that the corn would be placed on the chain and held by the springs, so that no guides would be required and each butt would be placed on the chain in the proper position for the cutting operation.

From the above it will be understood that I do not desire to be limited in every instance to the construction herein shown and described, as various changes may be made by those skilled in the art which will accomplish the same purpose as my mechanism and yet come within the scope of my invention.

Having thus described my invention, what I claim as new, and desire to secure by Letters Patent, is—

1. In a device of the character described, a plurality of carriers adapted to receive and convey the corn, a guide adjacent said carriers against which the corn is adapted to contact, cutting means adapted to be actuated in order to remove the end of the corn, a spring adapted to engage with the ears for holding the same as the cutting means strikes the ears, a belt having a plurality of movable idlers engaging therewith, a belt having teeth thereon situated beneath said first-mentioned belt and between which the corn is adapted to pass in order to remove the husks.

2. In a device of the character described, a plurality of carriers adapted to receive and convey the corn, a guide adjacent said carriers against which the corn is adapted to contact, a knife adapted to be actuated in order to remove the end of the corn as it is conveyed by the carriers, a spring adapted to engage with the ears for holding the same as the knife strikes the ears, a belt having a plurality of movable idlers engaging therewith, a plurality of belts having teeth thereon situated beneath said first-mentioned belt, and between which the corn is adapted to pass in order to remove the husks and means for removing the husks from the belts.

3. In a device of the character described, a plurality of chains adapted to receive and convey the corn, a guide adjacent said chains against which the corn is adapted to contact, a knife adapted to be actuated in order to remove the end of the corn as it is conveyed by the chains, a spring adapted to engage with the ears as the knife strikes the same, a belt having a plurality of movable idlers engaging therewith, a plurality of belts having teeth thereon situated beneath said first-mentioned belt, and between which the corn is adapted to pass in order to remove the husks, means for removing the husks from the belts, and means for removing the silk from the corn.

4. In a device of the character described, cutting means, means for properly directing the corn to said cutting means, a plurality of teeth adapted to be suitably actuated, means for directing the corn to said teeth which latter are adapted to engage with and remove the husks from said corn, and freely-movable means for rotating and properly holding the corn in suitable relation with respect to said teeth.

5. In a device of the character described, cutting means, means for conveying the corn to said cutting means, a plurality of belts adapted to be suitably actuated, hooks on said belts and a belt situated above said plurality of belts and between which and the plurality of belts the corn is adapted to be conveyed, said belt moving continuously and holding said corn in suitable position with respect to said plurality of belts.

6. In a device of the character described, cutting means, means for conveying the corn thereto, a belt adapted to be suitably actuated, teeth on said belt, a belt suitably actuated and situated above said toothed belt and a plurality of freely-movable idlers in engagement with said last-mentioned belt.

7. In a device of the character described, cutting means, means for conveying the corn thereto, a plurality of belts adapted to be suitably actuated, teeth on said belts, a belt suitably actuated and situated above said plurality of belts, movable idlers in engagement with said last-mentioned belt, and means for cleaning said belts and teeth.

8. In a device of the character described, cutting means, means for conveying the corn thereto, means for actuating said cutting means, a plurality of belts, hooks on said belts, a plurality of rotary brushes and a belt adapted to be suitably actuated and extending over said plurality of belts and said brushes and between which the corn is adapted to pass.

9. In a device of the character described, a plurality of chains adapted to convey the corn, guides for properly locating the corn with respect to said chains, knives adapted to be suitably actuated in order to remove the ends of the corn, means adapted to engage the ears during the removal of the ends, another set of chains adapted to receive the corn after the cutting, guides for properly locating the corn, a plurality of belts situated between said last-mentioned chains, hooks on said belts, means for cleaning said belts, a plurality of brushes suitably rotated, a belt extending over said hook, belts and said brushes, and movable idlers engaging with said belt, the corn being adapted to be carried by said second set of chains between said hook-belts and the upper belt.

10. In a device of the character described, a plurality of chains adapted to receive and convey the corn, a guide adjacent said chains against which the corn is adapted to contact, a knife adapted to be actuated in order to remove the end of the corn as it is conveyed by the chains, a spring adapted to engage with the ear for holding the same as the knife strikes the ear, a belt having a plurality of movable idlers engaging therewith and a plurality of belts having teeth thereon, situated beneath said last-mentioned belt, and between which the corn is adapted to pass in order to remove the husks.

11. In a device of the character described, cutting means, means for conveying the corn thereto, means for removing the husks from the corn, means for conveying the corn over the husking means and freely-movable means adapted to rotate said corn and to hold the same in proper position with respect to said husk-removing means said means permitting the passage of corn of various diameters.

12. In a device of the character described, means for removing the end of the corn, a belt adapted to be suitably actuated, a second belt having teeth thereon situated adjacent said first-mentioned belt, and between which belts the corn is adapted to pass in order to remove the husks, and a plurality of movable idlers mounted in close proximity to each other and adapted to bear against the first-mentioned belt, in order to hold the same in proper relation to said second-mentioned belt, said idlers being so situated that the corn in its passage between the belts will always have one of said idlers resting thereupon, whereby the corn will be held in proper position with respect to the tooth-belt and the passage of corn of different diameters is permitted.

13. In a device of the character described, cutting means for removing the ends of the corn, a belt adapted to be suitably actuated, a plurality of freely-movable idlers in engagement with said belt situated in close proximity to each other, a second belt situated beneath said first-mentioned belt and having a plurality of teeth thereon and between which belts the corn is adapted to pass one of said idlers being adapted to always press the corn against the tooth-belt in order to remove the husks and silk-removing means with which the corn is adapted to contact after the removal of the husks.

14. In a device of the character described, cutting means for removing the ends of the corn, a belt suitably actuated, a plurality of rotatable idlers mounted to freely move in a vertical direction and in close proximity to each other and in engagement with said belt, a second belt situated beneath said first-mentioned belt and having teeth thereon between which belts the corn is adapted to pass to remove the husks, said rollers being adapted to positively hold the corn at all times in its passage between the belts in proper position with respect to said tooth-belt and automatically accommodate themselves to corn of various diameters whereby the same will all be properly husked.

15. In a device of the character described, cutting means for removing the ends of the corn, a belt suitably actuated, a plurality of rotatable idlers mounted in close proximity to each other and to freely move in a vertical direction and in engagement with said belt, a second belt situated beneath said first-mentioned belt and having teeth thereon between which belts the corn is adapted to pass to remove the husks, each of said idlers in turn being adapted to positively hold the corn in proper position with respect to said tooth-belt and automatically accommodate themselves to corn of various diameters, whereby the same will be properly husked and a third belt suitably situated in order to receive the husks and refuse and remove the same to a suitable point.

16. In a device of the character described, a belt adapted to be suitably actuated and situated between a portion of the frame of the device with which the corn is adapted to contact, teeth on said belt, a second belt adapted to be suitably actuated and situated adjacent said toothed belt and between which belts the corn is adapted to pass and a plurality of freely-movable idlers bearing upon said second-mentioned belt and adapted to hold the same in proper relation to said toothed belt, said idlers being adapted to be raised by the corn in its passage and being of such number as to insure the proper husking of a small ear of corn, should the same follow or precede a larger ear.

17. In a device of the character described, a carrier adapted to be actuated, projections on said carrier, a belt suitably actuated and situated adjacent said carrier, a plurality of freely-movable idlers engaging with said last-mentioned belt and between which and said tooth-carrier the corn is adapted to be passed in order to remove the husks and means for conveying the corn therebetween and said belts and idlers being so situated and arranged that when one idler is raised by the corn the adjacent idlers are not disturbed but hold the belt in such position that the next ear of corn is properly husked.

18. In a device of the character described, means for rotating the corn, a belt adapted to be suitably actuated, teeth on said belt, a belt suitably actuated and situated adjacent said toothed belt, and a plurality of freely-movable idlers engaging with said last-mentioned belt for rotating and properly holding the corn in suitable relation with respect to said teeth on said belt.

19. In a device of the character described, a carrier adapted to be actuated, teeth or hooks on said carrier means for conveying the corn over the carrier and means for rotating the corn during its passage over said carrier whereby the corn is husked.

WILLIAM G. CONOVER.

Witnesses:
E. J. BOSHART,
TH. F. CONOVER.